(12) United States Patent
Mi et al.

(10) Patent No.: US 8,613,542 B2
(45) Date of Patent: Dec. 24, 2013

(54) LIGHT GUIDE FILMS HAVING REDUCED BANDING LEVELS

(75) Inventors: Xiang-Dong Mi, Northborough, MA (US); Xinyu Zhu, Acton, MA (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 227 days.

(21) Appl. No.: 13/316,102

(22) Filed: Dec. 9, 2011

(65) Prior Publication Data
US 2013/0148377 A1   Jun. 13, 2013

(51) Int. Cl.
*F21V 7/04* (2006.01)

(52) U.S. Cl.
USPC ............................ 362/619; 362/606; 362/615

(58) Field of Classification Search
None
See application file for complete search history.

(56) References Cited

U.S. PATENT DOCUMENTS

| | | | |
|---|---|---|---|
| 7,056,005 B2* | 6/2006 | Lee | 362/625 |
| 7,530,721 B2* | 5/2009 | Mi et al. | 362/606 |
| 2011/0242847 A1* | 10/2011 | Greener et al. | 362/619 |
| 2011/0242851 A1* | 10/2011 | Landry et al. | 362/628 |

* cited by examiner

*Primary Examiner* — Britt D Hanley
(74) *Attorney, Agent, or Firm* — Edwin Oh

(57) ABSTRACT

The present invention provides a light guide plate comprising an input surface for receiving light from a light source, an output surface for emitting light, and a bottom surface opposing to the output surface, wherein at least one of the output surface and the bottom surface has a micro-pattern, the micro-pattern comprising a plurality of micro-lenses. The light guide plate further comprises micro-lens having a width w, a length l, a depth d, an orientation angle, a first base angle $\alpha_1$, a second base angle $\alpha_2$, a first entry angle $\beta_1$, and a second entry angle $\beta_2$ such that when depth change $\Delta d$ is 0.1 μm, area change ratio, defined as $$\frac{(l+\Delta l)\cdot(w+\Delta w)-l\cdot w}{l\cdot w},$$

is less than or equal to 0.95% and the beginning number density of the micro-lenses is greater than or equal to 8 per $mm^2$, $\Delta w$ being width change and $\Delta l$ being length change corresponding to depth change $\Delta d$.

6 Claims, 8 Drawing Sheets

| Example | LGP Length (mm) | $\alpha_1$ (°) | $\alpha_2$ (°) | $\beta_1$ (°) | $\beta_2$ (°) | $w$ (μm) | $l$ (μm) | D0 | N0 (mm$^{-2}$) | FOM (%) | Lens Visibility | Banding Visibility |
|---|---|---|---|---|---|---|---|---|---|---|---|---|
| A1 | 355 | 30 | 30 | 29 | 29 | 66 | 66 | 2.96% | 6.8 | 1.07 | Not acceptable | Not acceptable |
| A2 | 355 | 30 | 30 | 22 | 22 | 56 | 56 | 3.00% | 9.6 | 1.53 | Acceptable | Not acceptable |
| C0 | 174 | 30 | 30 | 29 | 29 | 66 | 66 | 6.16% | 14.1 | 1.07 | Acceptable | Not acceptable |
| C1 | 174 | 30 | 30 | 30 | 30 | 69.8 | 69.8 | 5.77% | 11.8 | 0.99 | Acceptable | Not acceptable |
| C2 | 174 | 30 | 30 | 31 | 31 | 72.6 | 72.6 | 5.30% | 10.1 | 0.94 | Acceptable | Acceptable |
| C3 | 174 | 30 | 30 | 31 | 31 | 75 | 75 | 5.05% | 9.0 | 0.90 | Acceptable | Acceptable |
| C4 | 174 | 30 | 30 | 33 | 33 | 77.8 | 77.8 | 4.84% | 8.0 | 0.85 | Acceptable | Acceptable |
| C5 | 174 | 30 | 30 | 33 | 33 | 80.2 | 80.2 | 4.66% | 7.2 | 0.82 | Not acceptable | Acceptable |
| C6 | 174 | 30 | 30 | 34 | 34 | 85.1 | 85.1 | 4.33% | 6.0 | 0.76 | Not acceptable | Acceptable |

FIG. 7B

| Example | $\alpha_1$ (°) | $\alpha_2$ (°) | $\beta_1$ (°) | $\beta_2$ (°) | w=l (µm) | FOM (%) | D0 | N0 (mm⁻²) |
|---|---|---|---|---|---|---|---|---|
| 1 | 20.0 | 36.5 | 39.0 | 39.0 | 30.0 | 2.2 | 4.73% | 52.6 |
| 2 | 42.5 | 38.0 | 10.3 | 10.3 | 36.0 | 3.7 | 14.94% | 115.3 |
| 3 | 35.0 | 20.0 | 25.0 | 25.0 | 30.0 | 2.8 | 7.43% | 82.6 |
| 4 | 50.0 | 50.0 | 35.3 | 35.3 | 75.0 | 0.6 | 4.85% | 8.6 |
| 5 | 20.0 | 26.0 | 24.7 | 24.7 | 54.0 | 1.7 | 7.91% | 27.1 |
| 6 | 50.0 | 33.5 | 51.7 | 51.7 | 30.0 | 1.3 | 3.16% | 35.1 |
| 7 | 20.0 | 44.0 | 17.9 | 17.9 | 63.0 | 1.6 | 11.01% | 27.7 |
| 8 | 30.5 | 20.0 | 35.5 | 35.5 | 90.0 | 0.8 | 4.62% | 5.7 |
| 9 | 30.5 | 20.0 | 8.6 | 8.6 | 30.0 | 5.9 | 19.77% | 219.7 |
| 10 | 41.0 | 39.5 | 57.2 | 57.2 | 90.0 | 0.4 | 3.39% | 4.2 |
| 11 | 38.0 | 39.5 | 25.4 | 25.4 | 90.0 | 0.7 | 7.28% | 9.0 |
| 12 | 20.0 | 35.0 | 41.9 | 41.9 | 78.0 | 0.8 | 4.72% | 7.8 |
| 13 | 50.0 | 20.0 | 24.5 | 24.5 | 90.0 | 0.9 | 7.68% | 9.5 |
| 14 | 50.0 | 26.0 | 26.9 | 26.9 | 57.0 | 1.2 | 6.77% | 20.8 |
| 15 | 26.0 | 50.0 | 13.4 | 13.4 | 30.0 | 3.8 | 12.26% | 136.2 |
| 16 | 50.0 | 50.0 | 16.9 | 16.9 | 30.0 | 2.8 | 11.57% | 128.6 |
| 17 | 50.0 | 20.0 | 45.8 | 45.8 | 84.0 | 0.7 | 3.20% | 4.5 |
| 18 | 26.0 | 50.0 | 40.1 | 40.1 | 90.0 | 0.6 | 4.07% | 5.0 |
| 19 | 33.5 | 50.0 | 55.6 | 55.6 | 54.0 | 0.7 | 3.61% | 12.4 |
| 20 | 20.0 | 24.5 | 24.5 | 24.5 | 90.0 | 1.0 | 8.04% | 9.9 |
| 23 | 49.0 | 23.7 | 45.4 | 45.4 | 43.4 | 1.2 | 3.46% | 18.4 |
| 24 | 49.4 | 42.5 | 56.2 | 56.2 | 53.3 | 0.6 | 3.03% | 10.7 |

FIG. 8

LIGHT GUIDE FILMS HAVING REDUCED BANDING LEVELS

FIELD OF THE INVENTION

This invention generally relates to a light guide plate, and more particularly relates to a light guide plate having selected micro-lenses to reduce undesirable banding and visibility defects.

BACKGROUND OF THE INVENTION

Liquid crystal displays (LCDs) continue to improve in cost and performance, becoming a preferred display type for many computer, instrumentation, and entertainment applications. Typical LCD mobile phones, notebooks, and monitors include a light guide plate for receiving light from a light source and redistributing the light more or less uniformly across the light guide plate. Conventional light guide plates use diffusive micro-lenses to extract light. Diffusive micro-lenses are printed dots, or created by laser ablation. Diffusive micro-lenses are not particularly effective in light extraction, however, they are effective in hiding cosmetic defects inherent in a process of making light guide plates. A more efficient type of light guide plates use micro-lenses having an optical surface. They typically produce ten percent or higher luminance than conventional diffusive light guide plates.

U.S. Publication No. 2011-0242851 discloses a flexible light guide plate having micro-lenses of optical surface. They can be made through the extrusion roll molding process. While this type of light guide plate is easy to make in mass production and efficient in light extraction, it may have undesirable subtle stripes (referred herein as "banding" or "banding defects") under certain lighting conditions.

Thus, while there have been solutions proposed for a particular light guide plate and a method for making the particular light guide plate, there remains a need for a thin light guide plate that can be easily made and have reduced level of banding defects.

SUMMARY OF THE INVENTION

The present invention provides a light guide plate comprising an input surface for receiving light from a light source, an output surface for emitting light, and a bottom surface opposing to the output surface, wherein at least one of the output surface and the bottom surface has a micro-pattern, the micro-pattern comprising a plurality of micro-lenses; wherein each micro-lens has a width w, a length l, a depth d, an orientation angle, a first base angle $\alpha_1$, a second base angle $\alpha_2$, a first entry angle $\beta_1$, and a second entry angle $\beta_2$ such that when depth change $\Delta d$ is 0.1 μm, area change ratio, defined as $$\frac{(l + \Delta l) \cdot (w + \Delta w) - l \cdot w}{l \cdot w},$$

is less than or equal to 0.95% and the beginning number density of the micro-lenses is greater than or equal to 8 per mm², $\Delta w$ being width change and $\Delta l$ being length change corresponding to depth change $\Delta d$.

BRIEF DESCRIPTION OF THE DRAWINGS

FIG. 7B is a summary of example light guide plates; and

FIG. 8 is a summary of another set of example light guide plates.

DETAILED DESCRIPTION OF THE INVENTION

Figure 1:
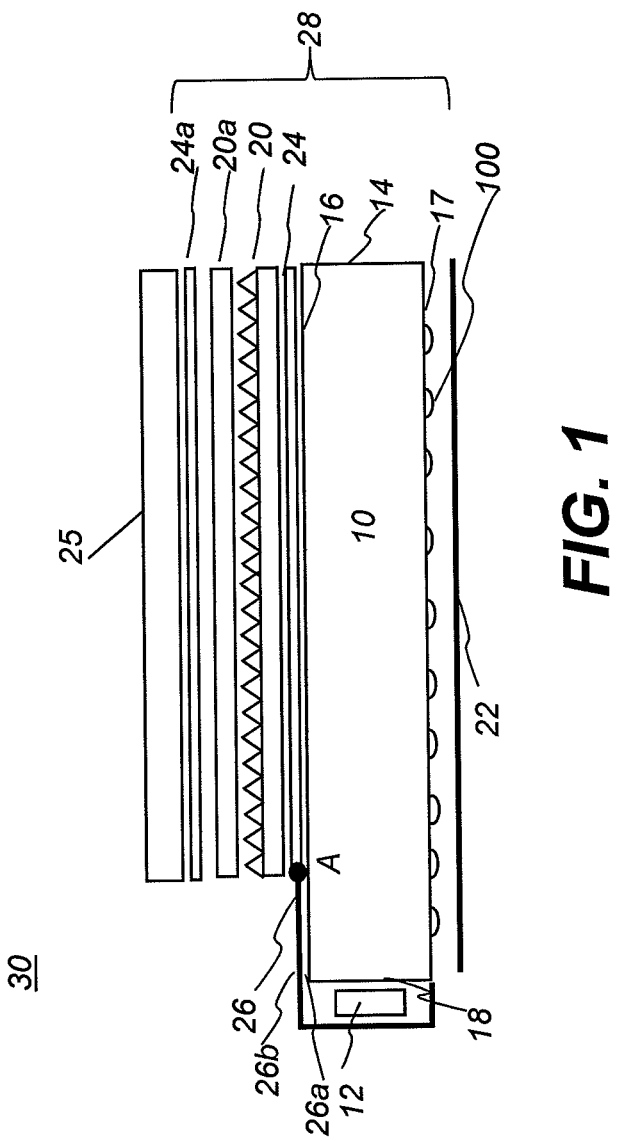
FIG. 1 shows a side view of a typical LCD comprising a plurality of optical components including a light guide plate of the present invention.

FIG. 1 shows schematically a side view of an LCD display apparatus 30 comprising an LCD panel 25 and a backlight unit 28. Backlight unit 28 comprises a plurality of optical components including one or two prismatic films 20, 20a, one or two diffusive films 24, 24a, a bottom reflective film 22, a top reflective film 26, and a light guide plate (LGP) 10. Light guide plate 10 is different from other optical components in that it receives light emitted from one or more light sources 12 through its input surface 18, redirects light through its bottom surface 17, end surface 14, output surface 16, side surfaces 15a, 15b (not shown) and reflective film 22, and eventually provides light relatively uniformly to other optical components. Targeted luminance uniformity is achieved by controlling the density, size, and/or orientation of micro-lenses 100 (sometimes referred to as discrete elements, or light extractors) on bottom surface 17 and/or output surface 16. Top reflective film 26 typically covers LGP 10 for about 2 to 5 millimeters to allow improved mixing of light. It has a highly reflective inner surface 26a. Top reflective film 26 sometimes may have a black outer surface 26b, and is therefore referred to as black tape. Typically light guide plate 10 is evaluated from point A, which is at the end of top reflective film 26. From point A rightward is the viewing area.

Light guide plate 10 according to the present invention has a micro-pattern, which in one embodiment consists of a plurality of substantially identical micro-lenses, and the density of the micro-lenses varies in one or two dimensions. In the following, "substantially identical micro-lenses" and density of the micro-lenses are described.

While no two micro-lenses are perfectly identical, micro-lenses are considered to be "substantially identical" if they have the same shape and the same orientation. More specifically, the variation of their length, width, and depth is preferably within +/−3 μm (or 5.4% for a 56 μm sized micro-lens), and more preferably within +/−1 μm (or 1.8% for 56 μm size micro-lens); and the variation of their orientation angle is preferably within +/−5 degrees, and more preferably within +/−2 degrees.

Figures 2A, 2B:
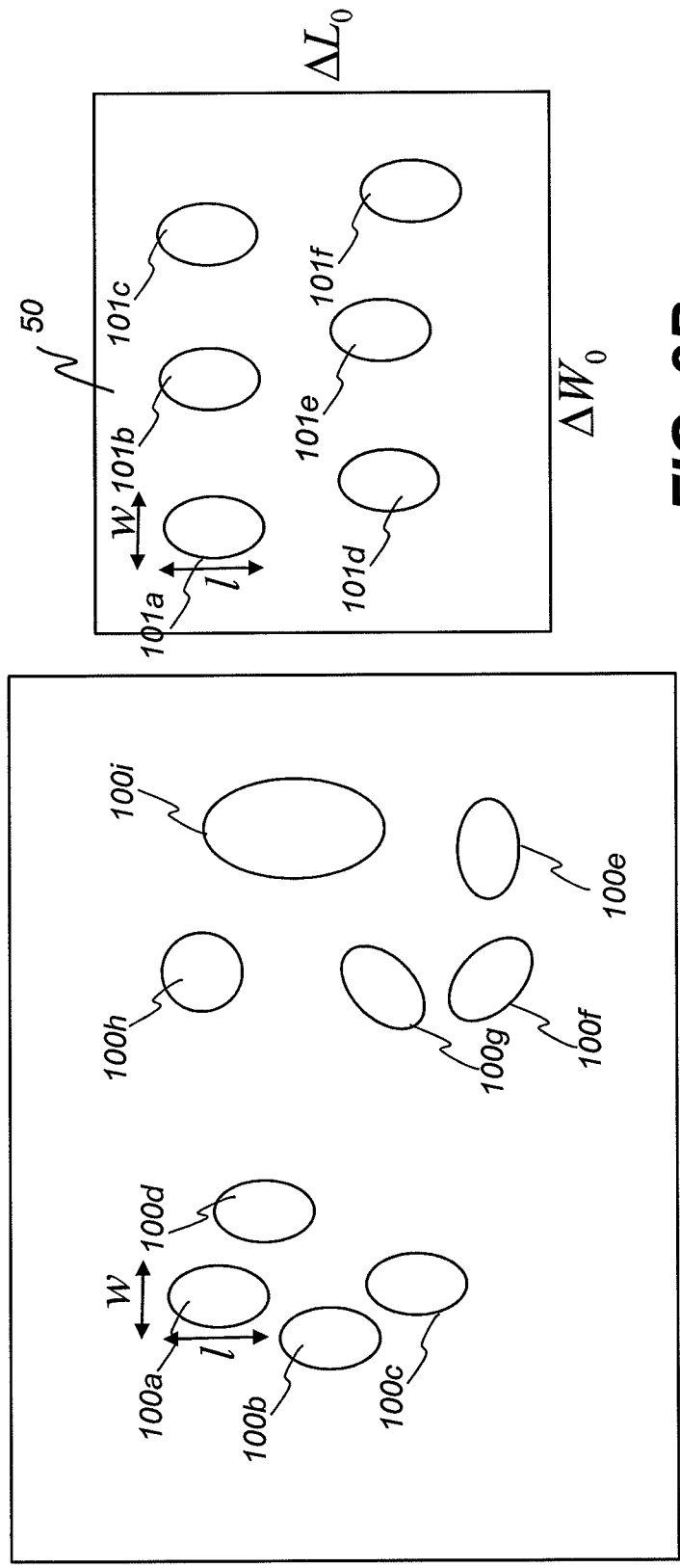
FIG. 2A shows a number of micro-lenses, some of which are substantially identical and useful for the present invention.
FIG. 2B shows a number of micro-lenses, illustrating the area density and the number density.

Referring to FIG. 2A, micro-lenses 100a, 100b, 100c, 100d are considered to be substantially identical because they all have the same shape and the same orientation angle. They have the same shape because they have the same width w, length l, and depth (not shown). Micro-lenses 100e, 100f, 100g are not substantially identical to micro-lens 100a because they have different orientation angle than micro-lens 100a though they have the same shape as micro-lens 100a. Micro-lens 100h is not substantially identical to micro-lens 100a because it is circular in shape while micro-lens 100a is elliptical. Micro-lens 100i is not substantially identical to micro-lens 100a because it is substantially larger than micro-lens 100a though they both are elliptical.

"Substantially identical" micro-lenses are made from the same process by substantially identical tools. The tools are considered to be substantially identical if they are made by the same process with the same target, or they differ from each other only by acceptable normal wear.

The advantage of using substantially identical micro-lenses is that they are easy to make because only one tool or multiple identical tools are needed. As a comparison, when two or more sets of micro-lenses with different sizes are targeted, two or more sets of tools are needed, or different processes are needed.

The number density ND is defined as the number of micro-lenses per unit area, and the area density D is defined as the total area of micro-lenses per unit area, where unit area is typically chosen in the order of 0.5-1.5 mm² for practical use. Referring now to FIG. 2B, the unit area is defined by a width $\Delta W_0$ and a length $\Delta L_0$, containing six micro-lenses 101a-101f, each having a width w and a length l. The number density $ND=6/(\Delta W_0 \Delta L_0)$, while the area density $D=6(w \cdot l)/(\Delta W_0 \Delta L_0)$. The number density may be a fractional number when one or more lenses cross the boundary of the chosen unit area. In the following, the density refers to the area density of micro-lenses. The number density and area density near Point A shown in FIG. 1 are referred to as starting number density N0 and starting area density D0 respectively.

There are many types of banding defects in a display, particularly in an LCD. The banding defects addressed in the present invention are only from a light guide plate, meaning that they can be observed in the absence of an LCD panel, any diffusive film, and any prismatic film.

Figure 3:
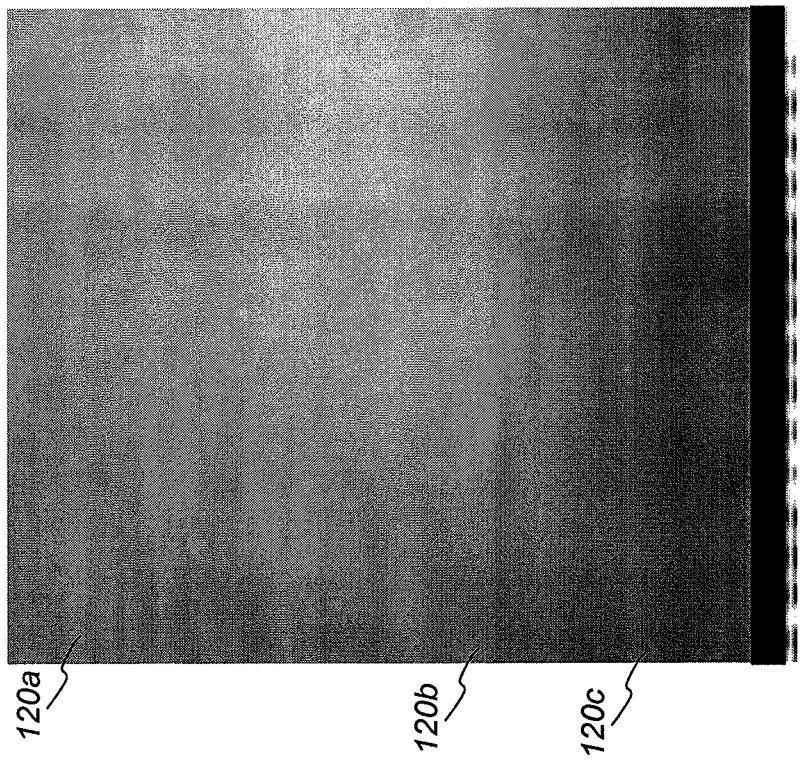
FIG. 3 shows an image of a light guide plate that has banding defects.

FIG. 3 shows banding defects observed from a light guide plate having micro-lenses of optical surface. They appear like black and white bands 120a, 120b, 120c. They generally run parallel to the width or length direction of a light guide plate. The banding defects are not observed in conventional light guide plates having diffusive micro-lenses.

Banding defects are believed to come from unique engraving and extrusion processes that produce micro-lenses on the optical surface. For example, roller surface profile may vary in the order of 0.1 μm, or engraving tool may hit the roller surface at slightly different depth.

Figure 4:
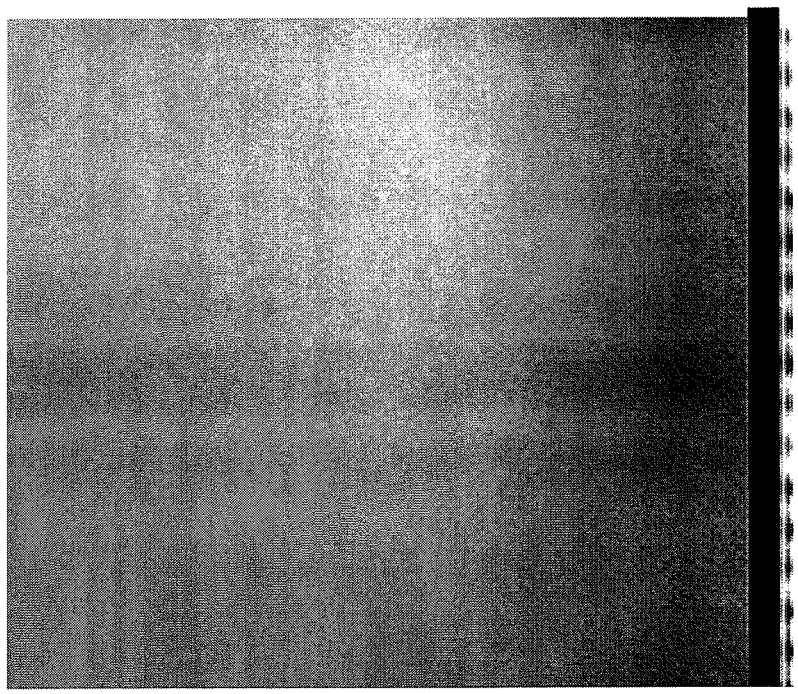
FIG. 4 shows an image of a light guide plate with a reduced level of banding according to the present invention.

FIG. 4 shows an image of a light guide plate according to the present invention, which has little observable banding defects.

Another type of cosmetic defect on a light guide plate having micro-lenses of optical surface is lens visibility. When the number density of micro-lenses is too low, the micro-lenses appear visible due to a high contrast between the area where there is a micro-lens and the area when there is no micro-lens. This defect is more noticeable in a backlight unit where only one or two pieces of film placed on top of the light guide plate compared to a backlight unit where three or four pieces of film are placed on top of the light guide plate. Usually the starting number density N0 is lower than the number density in other areas of a light guide plate. Therefore, the feature visibility is strongly related to the starting number density N0. It has been found that N0 is preferably greater than and equal to 8 per mm², and most preferably greater than equal to 9 per mm², to avoid the lens visibility defect.

Feature visibility defect is less of an issue on a light guide plates having diffusive micro-lenses because diffused light reduces the difference between the area where there is a micro-lens and the area when there is no micro-lens.

FIGS. 5A-5D show different views of a micro-lens 101 of optical surface.

Figure 5A:
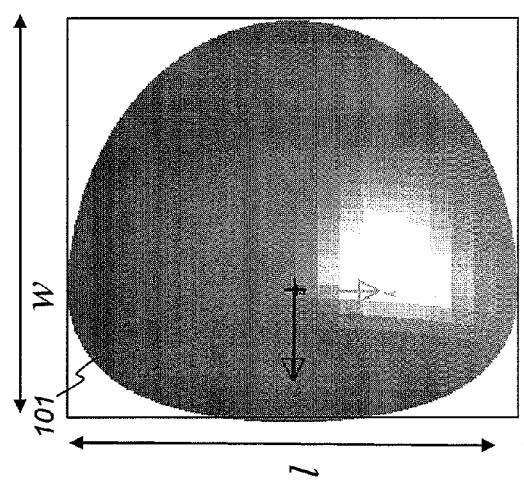
FIG. 5A shows a top view of a micro-lens.
Figure 5B:
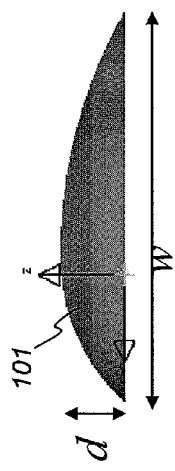
FIGS. 5B and 5C show cross-sectional views of the micro-lens in two orthogonal planes.
Figure 5C:
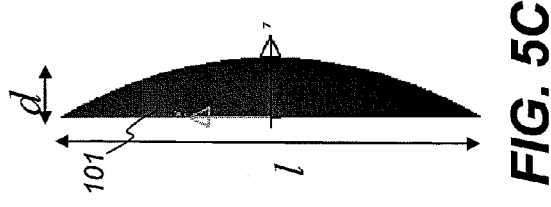
Figure 5D:
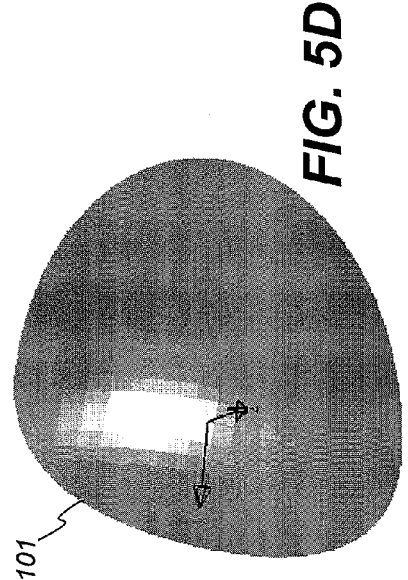
FIG. 5D shows a perspective view of the micro-lens.

FIG. 5A is a top view. FIGS. 5B and 5C are side views in the width and length directions, respectively and FIG. 5D is a perspective view. Micro-lens 101 has a length l, a width w, and a depth d.

Figure 6A:
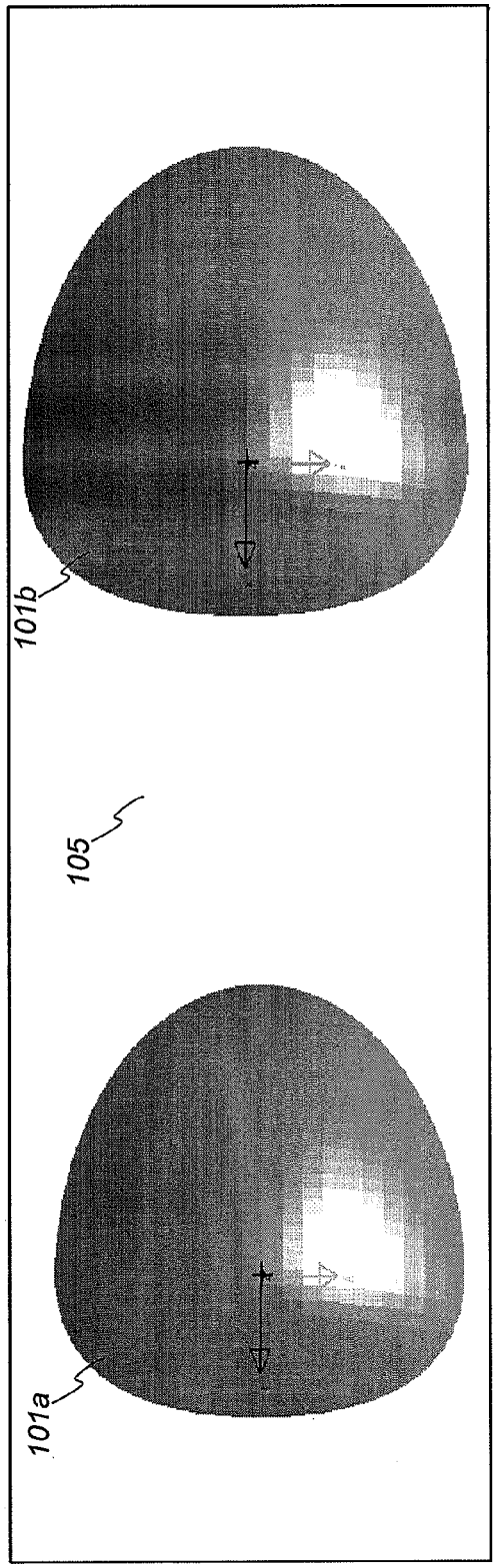
FIG. 6A shows a top view of two micro-lenses on a roller having a surface profile.

FIG. 6A shows a top view of two micro-lenses 101a and 101b of optical surface engraved on a roller surface with a surface profile 105. They have the same orientation angles.

Figure 6B:
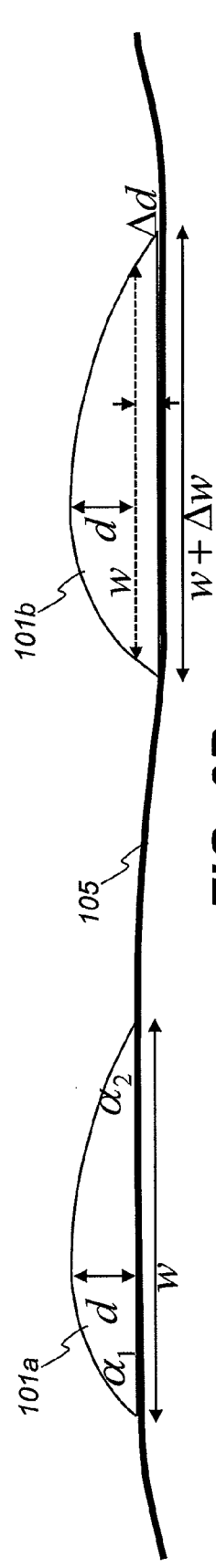
FIGS. 6B and 6C show cross-sectional views of the two micro-lenses in two orthogonal planes.
Figure 6C:
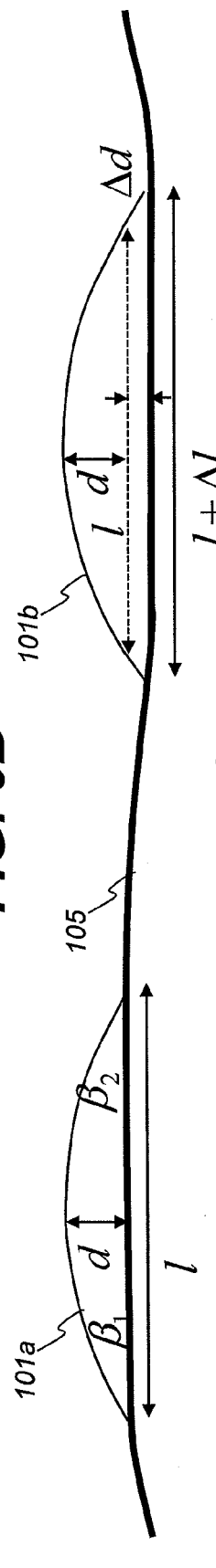

FIG. 6B, corresponding to FIG. 5B, shows micro-lenses 101a and 101b in a side view containing the width and the depth. FIG. 6C, corresponding to FIG. 5C, shows micro-lenses 101a and 101b in a side view containing the length and the depth. Micro-lens 101a is characterized by a width w, a length l, a depth d, a first base angle $\alpha_1$, a second base angle $\alpha_2$, a first entry angle $\beta_1$, and a second entry angle $\beta_2$. The entry angles $\beta_1$, $\beta_2$ are controlled by the engraving process. Generally, it is easier to make a micro-lens with smaller entry angles; and it is currently difficult to make a micro-lens having entry angles greater than 35°.

Micro-lens 101b is intended to be made identical to micro-lens 101a. However, because surface profile 105 varies by depth change $\Delta d$ from the location where micro-lens 101a is made to the location where micro-lens 101b is made, the width, the length, and depth of micro-lens 101b becomes $w+\Delta w$, $l+\Delta l$, and $d+\Delta d$ instead of w, l, and d, respectively, where $\Delta w$ represents width change and $\Delta l$, the length change. The areas of micro-lenses 101a, 101b are $w \cdot l$ and $(w+\Delta w)(l+\Delta l)$, respectively. Surface profile 105 of a roller is generally considered to be very flat. However it does vary by depth change $\Delta d$ from location to location in the order of 0.1 μm, for example. Typical micro-lenses according to the present invention have a depth d varying between 3.5 and 13 μm. Thus the relative depth change $\Delta d/d$ is less than 3%. Micro-lenses having such a small depth change are still considered as substantially identical. However, empirical data shows that they are different enough to cause visible banding defects. Depth change $\Delta d$ may also be caused in the extrusion process when the thickness of light guide plate varies, or caused by other unknown factors.

Micro-lenses 101a, 101b, due to depth change $\Delta d$, area change ratio, referred to as the figure of merit (FOM) hereinafter, is $$FOM = \frac{(l+\Delta l)\cdot(w+\Delta w) - l\cdot w}{l\cdot w} \approx \frac{\Delta l}{l} + \frac{\Delta w}{w} = \frac{\Delta d}{l}\left(\frac{1}{\tan\beta_1} + \frac{1}{\tan\beta_2}\right) + \frac{\Delta d}{w}\left(\frac{1}{\tan\alpha_1} + \frac{1}{\tan\alpha_2}\right),$$

where higher order $(\Delta w \cdot \Delta l)/(w \cdot l)$ is ignored. In the following FOM will be calculated for depth change $\Delta d=0.1$ μm for two reasons. First, a good roller can be made such that $\Delta d \leq 0.1$ μm. Second, depth change $\Delta d$ does not change the ranking order for different micro-lenses. In other words, a micro-lens having a lower FOM at one depth change will have a lower FOM at another depth change within practical limit compared to a micro-lens having a higher FOM. Thus FOM calculated for depth change $\Delta d=0.1$ μm can be used to differentiate micro-lenses. However, it should be emphasized that even if depth change Δd is actually smaller than 0.1 μm, FOM can still be calculated assuming depth change Δd is 0.1 μm.

EXAMPLES

A number of light guide plates have been made, each having substantially identical micro-lenses. However, micro-lenses vary from light guide plate to light guide plate. It has been found that micro-lenses having smaller FOM tend to show less noticeable banding. However, micro-lenses having smaller FOM tend to be more effective in extracting light, which lowers the beginning number density N0 for a given luminance uniformity target and makes feature visibility more of an issue as discussed above.

Figure 7A:
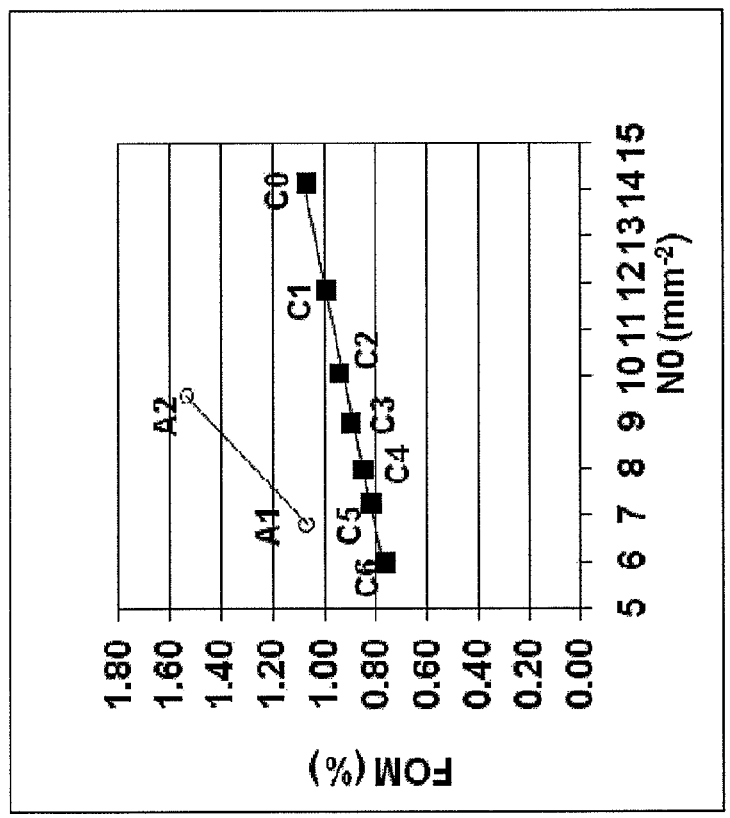
FIG. 7A shows the figure of merit (FOM) vs. starting number density N0 for example light guide plates having different micro-lenses.

FIG. 7A shows FOM vs. N0 for two targeted light guide plates. The plot of empty circles having Points A1, A2 is for a 15.6" 500-μm thick and 355-mm long light guide plate, while the plot of filled squares having Points C0-C6 is for a 13.3" 500-μm thick and 174-mm long light guide plate, both light guide plates being made of polycarbonate.

FIG. 7A shows two general trends. First, for the same light guide plate, a micro-lens of a lower FOM tends to have a lower beginning number density N0. Second, using the same micro-lens thus having the same FOM, a longer light guide plate requires lower beginning number density N0. Micro-lenses for light guide plates corresponding to Point A1 and C0 are the same. Therefore, both points have FOM≈1.07%. However, the 15.6" light guide plate has much lower N0 than the 13.3" light guide plate because the 15.6" light guide plate is longer. The first trend makes solving both banding defects and feature visibility nontrivial, because suppressing banding problem requires a micro-lens of lower FOM, while reducing feature visibility problem requires micro-lens of higher N0. The second trend suggests that it is even harder to solve the two problems for longer light guide plates.

FIG. 7B summaries example light guide plates in terms of LGP length, the geometry of micro-lenses, starting area density D0, starting number density N0, FOM, and resulting lens visibility and banding visibility. The geometry of each micro-lens is specified by base angles $\alpha_1$, $\alpha_2$, entry angles $\beta_1$, $\beta_2$, width w and length l.

For the 355-mm long LGP, example by Point A1 is not acceptable for either lens visibility or banding visibility. Example by Point A2 is acceptable for lens visibility, but not for banding visibility.

For the 174-mm long LGP, examples by Points C0, C1 are acceptable for lens visibility, but not for banding visibility. Example by Points C5 and C6 are acceptable for banding visibility, but not for lens visibility. However, examples by Points C3, C4 and C5 are acceptable for both banding visibility and not for lens visibility.

The inventive examples by Points C3, C4, C5 have the key features that N0≥8 and FOM≤0.95% when depth change Δd=0.1 μm, while comparative examples by Points A1, A2, C0, C1, C2, C6, and C7 do not have such features.

In all these examples, base angles $\alpha_1$ and $\alpha_2$ stay the same as 30°. Entry angles $\beta_1$ and $\beta_2$ vary between 22° and 34°. Width w and length l, which are set to be equal, vary from 56 μm to 85.1 μm.

FIG. 8 is a summary of more examples, in which each micro-lens has different base angles, that is $\alpha_1 \neq \alpha_2$. From example to example, base angles $\alpha_1$, $\alpha_2$ vary between 20° and 50°; entry angles $\beta_1$, $\beta_2$ vary between 8.6° and 56.2°; and width w and length l vary between 30 μm and 90 μm. Though w and l are equal in the examples, they do not have to be the same. The length l may vary between w and w+40 μm. Only selected examples 4, 11, 24 have the key features that N0≥8 and FOM≤0.95 assuming Δd=0.1 μm.

As discussed above, a micro-lens having entry angles greater than 35° is currently difficult to make. Thus example 11 is particularly attractive because its entry angles are 25.4°, while the entry angles for examples 4 and 24 are greater than 35°.

Many polymeric materials can be selected to practice this invention. The selected material must be sufficiently stiff and tough to minimize fracture and distortion during practical use. But most importantly, the selected material must possess high levels of transmittance over the visible range of the spectrum and low color. Materials useful in this invention include but are not limited to: Poly(methyl methacrylate) (PMMA), impact modified PMMA and other acrylic polymers, polycarbonates, poly cyclo olefins, cyclic block copolymers, polyamides, styrenics, polysulfones, polyesters, polyester-carbonates, and various miscible blends thereof.

The invention claimed is:

1. A light guide plate comprising:
an input surface for receiving light from a light source, an output surface for emitting light, and a bottom surface opposing to the output surface,
wherein at least one of the output surface and the bottom surface has a micro-pattern, the micro-pattern comprising a plurality of micro-lenses;
wherein each micro-lens has a width w, a length l, a depth d, an orientation angle, a first base angle $\alpha_1$, a second base angle $\alpha_2$, a first entry angle $\beta_1$, and a second entry angle $\beta_2$ such that when depth change Δd is 0.1 μm, area change ratio, defined as $$\frac{(l + \Delta l) \cdot (w + \Delta w) - l \cdot w}{l \cdot w},$$

is less than or equal to 0.95% and the beginning number density of the micro-lenses is greater than or equal to 8 per mm², Δw being width change and Δl being length change corresponding to depth change Δd.

2. The light guide plate of claim 1, wherein the variation of the width, length and depth of the plurality of micro-lenses is within 1.8 percent.

3. The light guide plate of claim 1, wherein the variation of orientation angle of the plurality of micro-lenses is within 2 degrees.

4. The light guide plate of claim 1, wherein the first and second base angles are the same.

5. The light guide plate of claim 1, wherein the first and second base angles are different.

6. The light guide plate of claim 1, wherein the first and second entry angles are smaller than 35°.

* * * * *